Oct. 2, 1928.                         1,686,412
H. A. LACERDA
DRIVER CHUCK
Filed July 8, 1927
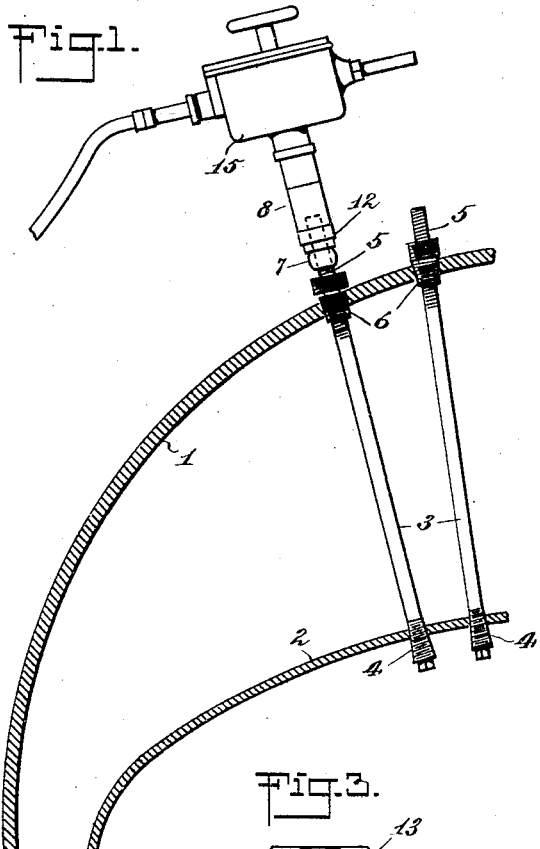
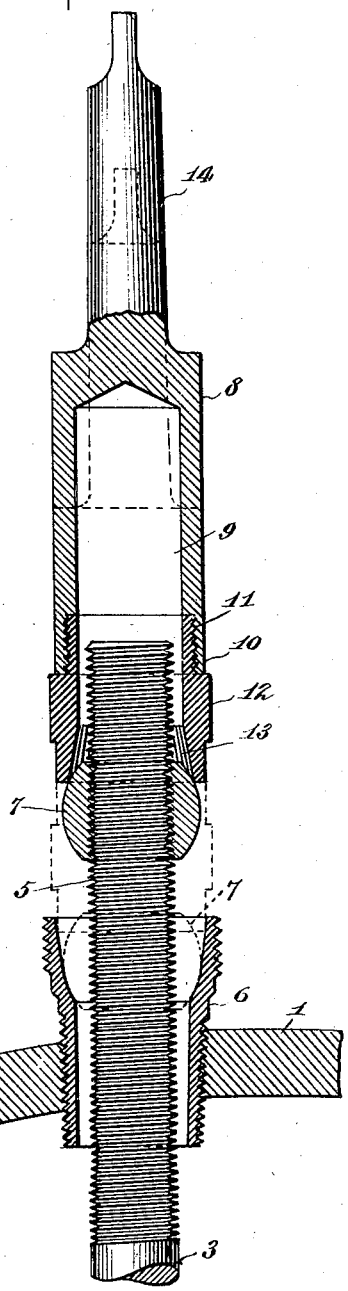
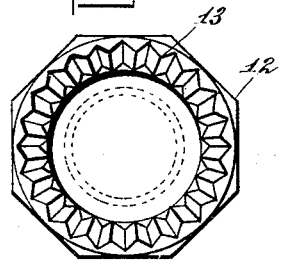
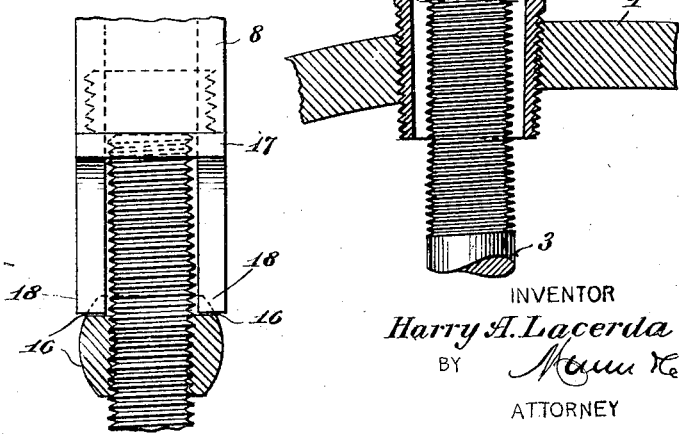
INVENTOR
Harry A. Lacerda
BY
ATTORNEY
WITNESSES Patented Oct. 2, 1928.

1,686,412

UNITED STATES PATENT OFFICE.

HARRY A. LACERDA, OF WATERVLIET, NEW YORK.

DRIVER CHUCK.

Application filed July 8, 1927. Serial No. 204,396.

This invention relates to driver chucks, and more specifically to a tool adapted for screwing the nut of a flexible stay bolt on the bolt into the socket, or remove the nut from the bolt and socket.

An object of the invention is to provide a tool of this character which comprises a hollow body portion to accommodate the end of the bolt, and a toothed or internally serrated removable member on the end of the body portion to engage the nut.

My improved tool may be and preferably is operated through the medium of a portable pneumatic driver, although of course the tool may be operated in any manner as I do not wish to be limited to the specific means for operating the tool.

A further object is to provide a tool of this character which will facilitate the manipulation of the nut without injury to the nut, and which will permit the operation to be easily, quickly and efficiently performed.

With these and other objects in view, the invention consists in certain novel features of construction and combinations and arrangements of parts which will be more fully hereinafter described and pointed out in the claim.

In the accompanying drawings—

Fig. 1 is a sectional plan view, showing my improved tool in operative position;

Fig. 2 is a view in longitudinal section through my improved tool, stay bolt, nut, boiler sheet, and socket;

Fig. 3 is an end view of my improved tool;

Fig. 4 is a perspective view showing the ordinary form of nut in general use; and Fig. 5 is a fragmentary view, partly in section and partly in elevation, illustrating a slightly modified form of my improved tool, which may be used in connection with the nut shown in Fig. 4.

1 and 2 represent boiler sheets or other plates or partitions adapted to be connected by stay bolts 3 of the flexible type. These bolts 3 are of standard form. They have tapering screw-threaded portions 4 at one end to screw into the sheet 2, and their other ends are screw-threaded, as shown at 5, and project through sockets 6 which are screwed into the other sheet or member 1.

The sockets 6 have cupped outer end portions to accommodate nuts 7 of general spherical form, so that in effect a ball and socket joint is had when the nut is screwed into the socket rendering the bolt flexible.

8 represents my improved tool, which is in the form of a hollow cylindrical body, the internal recess 9 therein being of a length sufficient to accommodate the screw-threaded end 5 of the bolt 4 during the manipulation of the nut 7.

This tool 8 is internally screw-threaded at its open end, as shown at 10, for the accommodation of a nipple 11 on a removable member 12. This removable member is of hollow or tubular form and is internally tapered at its extremity and provided with an internal annular series of teeth or serrations 13, these teeth or serrations having the taper of the annular member 12.

It is of course to be understood that this member 12 may be made removable so that it may be replaced by different sizes of members, or merely to replace a worn member, but so far as the tool itself is concerned the member constitutes a fixed part of the tube.

A shank 14 is provided on one end of the tool 8 for coupling engagement with a pneumatic driver 15 or other device for imparting rotary motion to the tube.

Nuts of this type are ordinarily provided with notches 16 in one end for the accommodation of a spanner wrench or other analogous tool to turn the same, and it is obvious that with my improved tool these notches may be dispensed with. However, my tool is capable of modification to utilize these notches, as clearly shown in Fig. 5, wherein I provide a removable member 17 on the end of the tool having lugs 18 to enter the notches 16 to couple the parts together for manipulation of the nut.

The removable member 12 is preferably made angular externally to receive a wrench to screw the same into and out of the tool, and the parts are made of such material as is necessary for strength and durability.

The operation is as follows:

The bolts 3 are projected through the sheets or plates 1 and 2, with the threaded ends 4 screwed into the plate 2 and the sockets 6 screwed into the sheets 1 with the bolts projecting through the sockets. The nuts 7 are then positioned on the bolts and my improved tool 8 is positioned against a nut, as clearly shown in Fig. 2, and caused to turn by reason of the pneumatic 15, or any other suitable means. Pressure applied on the tool against the nut causes the teeth or serrations 13 to engage the nut with sufficient frictional force to cause the parts to turn together, and the nut can be easily and quickly screwed into place in the socket 6.

The operation is the same in removing the nut, except of course that the tool will be turned in the opposite direction.

While I have illustrated what I believe to be a preferred embodiment of my invention, it is obvious that various changes and alterations might be made in the general form of the parts described without departing from my invention, and hence I do not limit myself to the precise details set forth but consider myself at liberty to make such changes and alterations as fairly fall within the spirit and scope of the appended claim.

I claim:

A chuck adapted for turning stay-bolt expansion nuts, comprising a tubular member having an internally tapered toothed or serrated outer end for engagement with a stay-bolt expansion nut, a body coupled to the member, said body and member having a longitudinal bore of a diameter and length to freely accommodate a stay bolt while the device is engaging a nut on the stay bolt.

HARRY A. LACERDA.